INVENTOR
Norman Lane
BY Kemon, Palmer, Stewart & Estabrook
ATTORNEYS

June 25, 1963 N. LANE 3,095,199

SOUND REPRODUCING APPARATUS USING DISC RECORDS

Filed June 19, 1961 4 Sheets-Sheet 2

INVENTOR
Norman Lane
BY Kemon, Palmer
Stewart & Estabrook
ATTORNEYS

INVENTOR
Norman Lane
BY
Kemon, Palmer
Stewart & Estabrook
ATTORNEYS

INVENTOR
Norman Lane
BY
Kemon, Palmer, Stewart & Estabrook
ATTORNEYS

United States Patent Office 3,095,199 Patented June 25, 1963

3,095,199
SOUND REPRODUCING APPARATUS USING DISC RECORDS

Norman Lane, Halesowen, Worcester, England, assignor to B S R Limited, a British company
Filed June 19, 1961, Ser. No. 117,907
Claims priority, application Great Britain June 20, 1960
3 Claims. (Cl. 274—10)

The present invention relates to improvements in sound reproducing apparatus of the kind utilising disc records.

Sound reproducing machines are well known for playing automatically from a plurality of disc records in single succession and many such machines make use of a long spindle upstanding from the centre of the turntable to support either alone or in conjunction with other parts a stack of disc records intended to be played, the records being released singly from the lower end of the elevated stack to fall along the spindle into the playing position on the turntable or onto records already resting on the turntable.

It is frequently desired to be able to use the machine to play one record only in which case the presence of the upstanding long spindle may be seen as an inconvenience.

Furthermore the upwardly projecting long spindle prevents advantage being taken of space otherwise available in the cabinet of the machine when not in use, for the storage of auxiliary equipment.

It is the object of the present invention to provide a machine of the kind having a long upstanding spindle which though effectively retained in its operative position when required to support a stack of records can be readily removed when not required.

In accordance with the invention a machine of the kind indicated making use of an upstanding long record spindle for supporting a stack of records is provided with a releasable retaining device for holding the long record spindle in its mounted position suitable for playing records from the stack automatically in succession and with a control in a position remote from the spindle when in said mounted position for effecting releasing movement of the retaining device to permit the spindle to be removed from its mounted position.

Preferably the control for the releasable retaining device is formed by a finger-operated knob located on the base plate of the machine at a point outside the periphery of the turntable of the machine.

With the arrangement according to the invention the long record spindle is held against inadvertent displacement from its mounted position as for example when removing played records over the spindle but the spindle can be readily removed following operation of the releasable retaining device without the need to disturb the normal position of the turntable or any other parts of the machine.

The invention is illustrated by way of example in the accompanying drawings in which FIG. 1 is a general perspective view of an automatic record player with which the present invention may be used.

Figure 1:
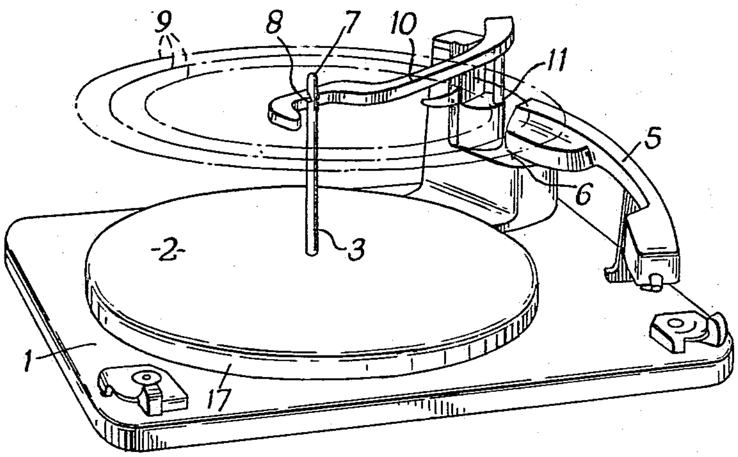

Referring to FIG. 1, the machine shown comprises a base plate 1, a turntable 2 mounted above the base plate, a record support spindle 3 extending upwards from the centre of the turntable 2, and a pick-up carried by a pick-up arm 5 mounted for up and down pivotal movement and transverse swinging movement in conventional manner in a bearing 6 located near one side edge of the base plate and capable of taking a rest position close to one edge of the base plate 1 when the machine is not in use, the pick-up arm being shown in this rest position in FIG. 1.

The upstanding long record spindle 3 is shown as of the well known kind intended to be held against rotation when mounted and having a shoulder 8 at one side of its upper end 7 (FIG. 4) for supporting a stack of records 9 (FIG. 1) and embodying means (not shown) operable by the automatic mechanism of the machine in common manner for releasing records singly from the lower end of the stack whence they slide from their elevated position down the spindle 3 into the playing position.

The machine shown also includes a "record-steady" arm 10 mounted for up and down and swinging movement in a bearing 11 near the bearing 6 of the pick-up arm 5, the arm 10 when the machine is in use extending towards the upper end of the spindle 3 and resting upon the stack of records 9 supported by the spindle 3 as shown in FIG. 1 to maintain the stack horizontal but being capable of being swung on its bearing 11 to an out-of-the-way position in which it extends over and along the pick-up arm 5 in the above described rest position of the latter.

With the pick-up arm 5 in its rest position and the record-steady arm 10 extending over and along the pick-up arm, the presence of the long spindle 3 upstanding from the centre of the turntable 2 represents an inconvenience from the point of view of utilisation of space above the turntable in a cabinet housing the machine and also from the point of view of using the machine as a player for single records placed on the turntable 2 by hand.

In the machine shown the turntable 2 is of the kind having a central depression or recess 12 and a central hollow boss 13 on its underside and is mounted for rotation about a vertical tube 14 fixed to the base plate 1 of the machine with its upper end in the recess 12 of the turntable 2 and below the record-supporting surface thereof, the lower end of the boss 13 resting upon an anti-friction bearing 15 (FIG. 4) in fixed position on the base plate 1, and the turntable being retained in position on the tube 14 by means of a circlip 16 engaged in a groove in the upper end of the tube. Rotation may be imparted to the turntable 2 in any well known manner, e.g., by means of a motor-driven friction wheel (not shown) in engagement with the inner surface of the depending peripheral edge 17 of the turntable 2.

The lower end 18 (FIG. 4) of the record supporting spindle 3 is a sliding fit within the fixed vertical tube 14 and the spindle 3 is held against rotation by engagement of a radial projection or pin 19 on the spindle in a notch 20 formed in the upper end of the tube 14, the pin 19 also serving to limit the depth of insertion of the lower end 18 of the spindle 3 into the tube 13.

Figure 4:
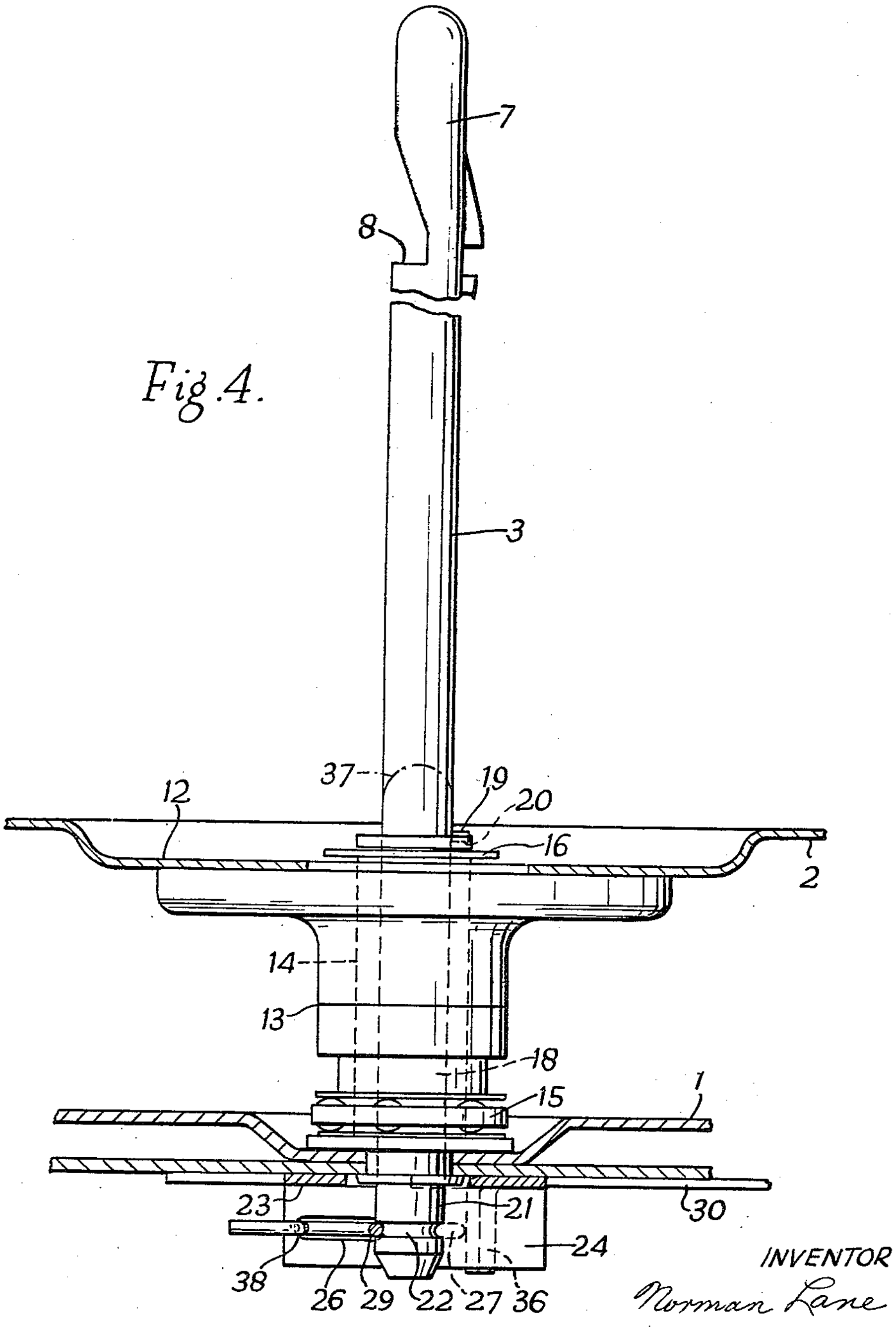
FIG. 4 is a view on an enlarged scale taken on the line IV—IV of FIG. 3 showing the record spindle and its mounting.

The lower extremity of the spindle 3 in the mounted position extends below the base plate as shown at 21 in FIG. 4 and a circumferential groove 22 is formed in said lower extremity and the portion of the extremity 21 below the groove 22 is tapered as shown in FIG. 4.

In a fixed position on the underside of the base plate 1 is mounted an apertured plate 23 bent to provide downwardly extending lugs 24 and 25 located on opposite sides of the projecting lower extremity 21 of the spindle 3.

These lugs 24 and 25 are provided with horizontal slots one of which is shown at 26 in the lug 24 in FIG. 4.

A wire spring 27 is mounted in the slots in the lugs 24, 25, said spring including a substantially semi-circular loop portion 28 one end of which is hooked as shown at 38 and abuts one end of the slot 26 in the lug 24 and a cranked leg portion 29 extending from the other end of the loop portion 28 through the slots in the two lugs 24, 25, and engaging in the circumferential groove 22 in the extremity 21 of the spindle 3 under the spring bias of the loop portion 28.

The length of one or both of the slots in the lugs 24 and 25 is such as to prevent the leg portion 29 of the spring engaged therein from passing across the axis of the tube 14.

Figure 2:
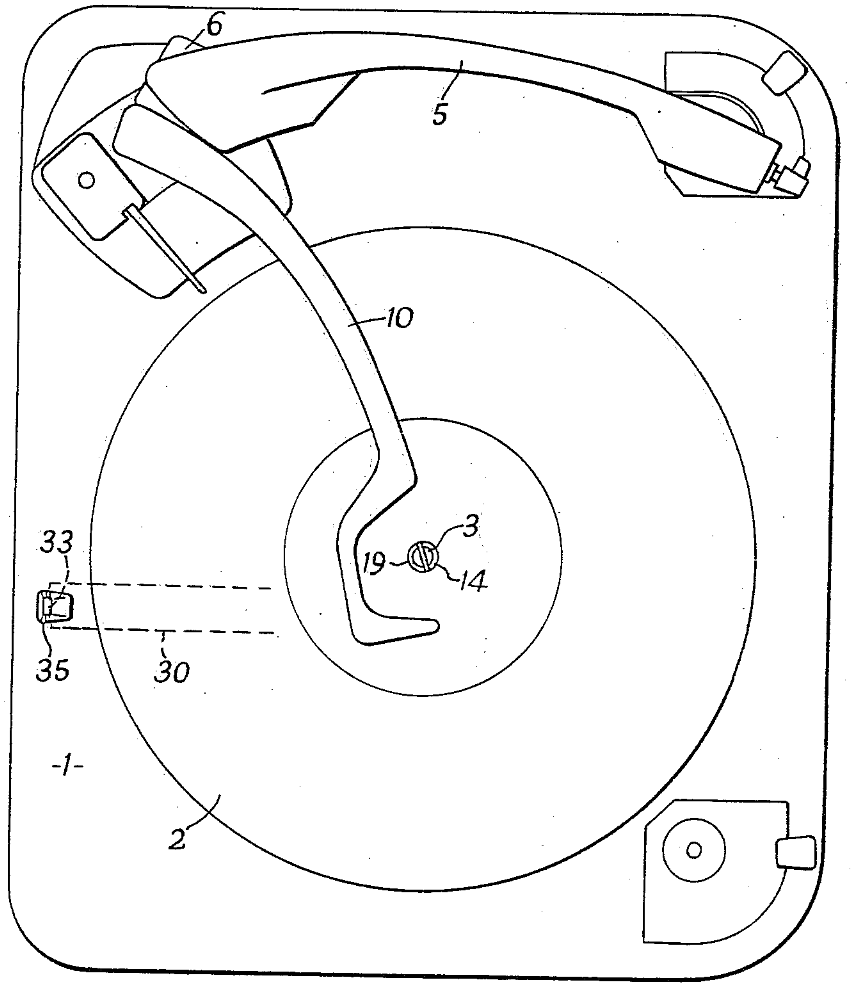
FIG. 2 is an enlarged plan view of the machine shown in FIG. 1.

On the underside of the base plate 1 is mounted a bar 30 arranged for straight line guided movement by engagement of a slot 31 in the bar with a fixed pin 32 depending from the base plate and a lug 33 on the free end of the bar extending upwards through a slot 34 in the base plate 1, the lug 33 having a finger knob 35 fixed to its upper end and arranged to slide on the base plate. The finger knob 35 is located on the base plate at a point outside the periphery of the turntable 2 (FIG. 2).

On the underside of the inner end of the bar 30 is mounted a fixed and depending lug 36 in a position for engagement with one side of the loop portion 28 of the spring 27.

In the mounted or normal position of the record spindle 3, the radial pin 19 is engaged in the notch 20 at the upper end of the tube 14 so that the spindle is held against dotation in the fixed tube, and the leg portion 29 of the spring 27 is engaged in the circumferential groove 22 in the lower extremity of the spindle and is held engaged therein by the bias of the spring so that the spindle 3 cannot be lifted from within the tube 14.

Figure 3:
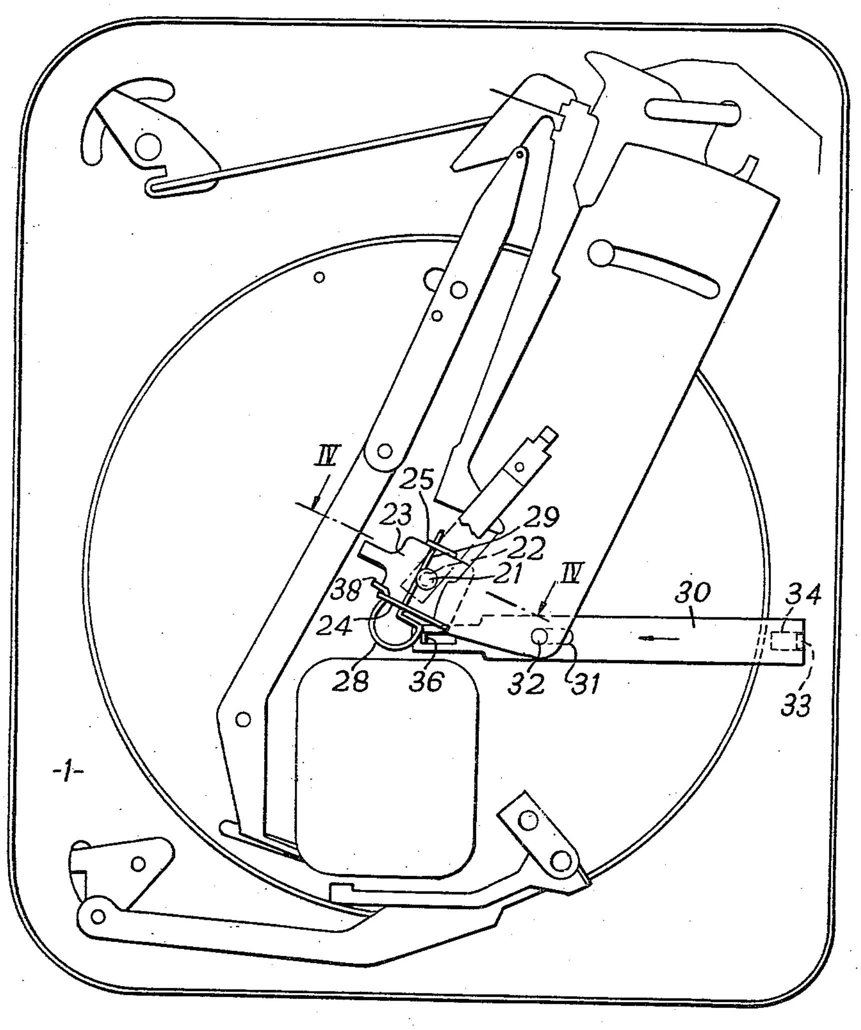
FIG. 3 is an underside view of FIG. 2.

To permit removal of the spindle 3 the finger knob 35 outside the edge of the turntable is manipulated to thrust the bar 30 inwards, i.e., in the direction of the arrow in FIG. 3 to engage the lug 36 on the bar 30 with one side of the loop portion 28 of the spring 27 to distort the loop portion and cause the leg portion 29 of the spring to move in the slots in the fixed lugs 24 and 25 in the direction to disengage it from the groove 22 in the lower extremity of the spindle 3. With the finger knob 35 held, the spindle 3 can now be removed from within the fixed tube 14.

Release of the finger knob 35 permits return movement of the bar 30 to the normal or rest position under the urge of the spring 27 the leg portion 29, however, being prevented from crossing the axis of the tube 14 by engagement with the end of one or both of the slots in the lugs 24 and 25.

To remount the spindle 3 it is merely necessary to thrust the lower end thereof downwards in the fixed tube 14 until the projection 19 on the spindle engages in the recess 20 in the upper end of the fixed tube 14, the leg portion 29 of the spring 27 being displaced by engagement therewith of the tapered lower extremity of the spindle and finally snapping into the groove 22 when the spindle is fully home.

When the machine is to be used as a player of single records placed by hand on the turntable, a shorter substitute spindle, the upper end of which is indicated by dotted lines at 37 in FIG. 4, and of a form at its lower end similar to that of the long spindle 3, may be mounted in the tube 14.

The use of a remote controlled spindle-retaining and releasing device avoids the need for any modification of the part of the spindle or its housing accessible from above the turntable or for the removal of the turntable itself or lifting of the base plate.

I claim:

1. In sound reproducing apparatus for use with disc records the combination comprising: an apertured base plate; a turntable above the base plate; an elongated round spindle composed of and a lower part upstanding through the center of said turntable, said lower part of said spindle extending downwards through the aperture of said base plate to a position below said base plate and removably mounted therein so as to be upwardly and axially movable in the aperture to be completely removed therefrom; means defining a radial notch in the exterior surface of said lower part of said spindle; a fixed abutment mounted on the under side of said base plate; an expansible spring loop mounted beneath said base plate and compressed between said fixed abutment and said lower part of said spindle with a portion of said spring engaging in said notch to restrain said spindle against axial movement relative to said base plate; and a manually operable element mounted on said base plate, engageable with said spring, and movable in a direction parallel to the plane of said base plate to force said spring out of said notch to release said spindle.

2. Sound reproducing apparatus as claimed in claim 1 and further including: a second fixed abutment mounted on the under side of said base plate and engageable by said portion of said spring when said spindle has been withdrawn and said element is disengaged from said portion of said spring, said second fixed abutment limiting the extent of the expansible movement of said portion of said spring to a position within the periphery boundary of the aperture in said base plate, and a tapered section at the lower end of said lower part of said spindle whereby when said lower part of said spindle is pressed downwardly into the aperture said tapered section will engage said portion of said spring and displace it against the force of said spring to permit continued movement of said spindle to bring said notch into alignment with the said portion of said spring.

3. Sound reproducing apparatus as defined by claim 2 in which said first and second abutments comprise slotted parallel projections, the slots being mutually parallel in a plane normal to the axis of said spindle, and in which said spring comprises a two-armed loop lying in said plane and located in one of said slots.

References Cited in the file of this patent

UNITED STATES PATENTS

| | | |
|---|---|---|
| 2,247,659 | Hoehn | July 1, 1941 |
| 2,381,927 | Roberts | Aug. 14, 1945 |
| 2,762,627 | Johnson | Sept. 11, 1956 |
| 2,918,289 | Hardy | Dec. 22, 1959 |

FOREIGN PATENTS

| | | |
|---|---|---|
| 133,843 | Switzerland | Sept. 2, 1929 |